(12) United States Patent
Matsuda et al.

(10) Patent No.: US 11,539,228 B2
(45) Date of Patent: Dec. 27, 2022

(54) CHARGING CONTROL DEVICE

(71) Applicant: Toyota Jidosha Kabushiki Kaisha, Toyota (JP)

(72) Inventors: Motoharu Matsuda, Nagakute (JP); Shingo Yumoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 17/111,029

(22) Filed: Dec. 3, 2020

(65) Prior Publication Data

US 2021/0175732 A1    Jun. 10, 2021

(30) Foreign Application Priority Data

Dec. 10, 2019  (JP) .............................. JP2019-223110

(51) Int. Cl.
 *H02J 7/00* (2006.01)
(52) U.S. Cl.
 CPC .......... *H02J 7/0071* (2020.01); *H02J 7/0048* (2020.01)
(58) Field of Classification Search
 CPC ...... H02J 7/007; H02J 7/0071; H02J 7/00712; H02J 7/00714; H02J 7/007188; B60L 53/00
 See application file for complete search history.

(56) References Cited

U.S. PATENT DOCUMENTS

| 8,504,232 | B2 * | 8/2013 | Aoki | B60W 20/13 701/22 |
| 2017/0057376 | A1 * | 3/2017 | Murata | B60L 53/14 |
| 2020/0274375 | A1 * | 8/2020 | Griffiths | B60R 16/033 |

FOREIGN PATENT DOCUMENTS

| JP | 5673062 B2 | 2/2015 |
| JP | 2017-184374 A | 10/2017 |

* cited by examiner

*Primary Examiner* — Nathaniel R Pelton
*Assistant Examiner* — Sadia Kousar
(74) *Attorney, Agent, or Firm* — Dinsmore & Shohl LLP (57) ABSTRACT

A CPU, when determining that the predicted minimum value of a limit value of charging power is not smaller than the minimum power of a charger, controls charging such that charging is performed in a normal mode, the normal mode being a mode in which a lower limit of a command value of supply power is the minimum power, when determining that the predicted minimum value is smaller than the minimum power, controls charging such that charging is performed in an estimation mode, that is a mode in which the lower limit of the command value is an estimated value of the minimum power of the charger, the estimated value being smaller than the minimum power, and controls charging such that charging is performed in the estimation mode by using, as the command value, power between a current limit value of the charging power and the estimated value.

4 Claims, 6 Drawing Sheets

CHARGING CONTROL DEVICE

CROSS REFERENCE TO RELATED APPLICATIONS

This nonprovisional application claims priority to Japanese Patent Application No. 2019-223110 filed on Dec. 10, 2019 with the Japan Patent Office, the entire contents of which are hereby incorporated by reference.

BACKGROUND

Field

The present disclosure relates to a charging control device, and particularly to a charging control device including a control unit that controls charging and discharging of a power storage device.

Description of the Background Art

There has been conventionally known a technique for stopping charging when an abnormality is detected in control of charging of a power storage device from an external charging device (refer to, for example, Japanese Patent No. 5673062).

SUMMARY

Figure 7:
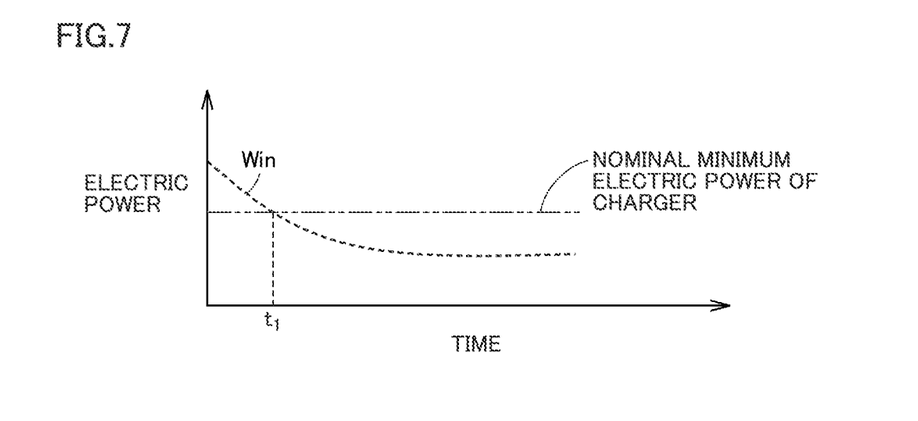
FIG. 7 shows a relationship between nominal minimum electric power of a charger and a charging electric power limit value of a charging device.

FIG. 7 shows a relationship between nominal minimum electric power of a charger and a charging electric power limit value of a charging device. Referring to FIG. 7, a nominal minimum output current is set for a DC charger adapted to perform quick charging. Therefore, in principle, control for charging a power storage device with electric power that is less than minimum output electric power corresponding to the nominal minimum output current is impossible. In addition, when the power storage device is charged with electric power that exceeds a limit value Win of charging electric power for the power storage device, the power storage device is burdened, which leads to a failure or a short life of the power storage device. Therefore, when it is predicted that charging electric power limit value Win of the power storage device will fall below the minimum output electric power corresponding to the minimum output current of the charger (after time t1 in FIG. 7), i.e., when a predicted minimum value of Win<the minimum output electric power of the charger is satisfied, the charging electric power for the power storage device exceeds the predicted minimum value of limit value Win, and thus, exceeds limit value Win with high possibility. Therefore, charging is stopped in order to protect the power storage device. As a result, charging can be safely performed.

In the charger, although control for charging the power storage device with actual minimum output electric power that is less than the nominal minimum output electric power is actually possible, a notification about the nominal minimum output electric power that is higher than the actual minimum output electric power may in some cases be provided to the power storage device side. In this case, charging is stopped, although charging can be continued actually, which may make it impossible to perform charging as much as possible.

The present disclosure has been made to solve the above-described problem, and an object of the present disclosure is to provide a charging control device that makes it possible to safely continue charging as much as possible.

A charging control device according to the present disclosure includes a control unit that controls charging and discharging of a power storage device. The control unit calculates a predicted minimum value of a limit value of charging electric power for the power storage device, obtains, from the external charging device, a nominal value of minimum suppliable electric power of an external charging device, determines whether or not the predicted minimum value is smaller than the nominal value, when determining that the predicted minimum value is not smaller than the nominal value, controls charging such that charging of the power storage device from the external charging device is performed in a first mode, the first mode being a mode in which a lower limit of a command value of supply electric power from the external charging device is set to the nominal value, when determining that the predicted minimum value is smaller than the nominal value, controls charging such that charging of the power storage device from the external charging device is performed in a second mode, the second mode being different from the first mode and being a mode in which the lower limit of the command value is set to an estimated value of the minimum suppliable electric power of the external charging device, the estimated value being smaller than the nominal value, and controls charging such that charging is performed in the second mode by using, as the command value, electric power between a current limit value of the charging electric power for the power storage device and the estimated value.

With such a configuration, even when the predicted minimum value of the limit value of the charging electric power for the power storage device is smaller than the nominal value of the minimum suppliable electric power of the external charging device, charging is performed by using, as the command value, the electric power between the current limit value of the charging electric power for the power storage device and the estimated value of the minimum suppliable electric power of the external charging device. Therefore, even when the predicted minimum value is smaller than the nominal value of the minimum suppliable electric power, charging can be continued as much as possible. In addition, charging can be continued so as not to exceed the current limit value of the charging electric power. As a result, there can be provided a charging control device that makes it possible to safely continue charging as much as possible.

In some embodiments, the control unit controls charging such that charging is started in the second mode by using, as the command value, start-time electric power between the limit value and the estimated value, detects supply electric power supplied from the external charging device to the power storage device, determines whether or not a difference between the detected supply electric power and the command value is less than a prescribed value, and continues charging, when determining that the difference is less than the prescribed value.

With such a configuration, charging is started by using, as the command value, the start-time electric power between the current limit value of the charging electric power for the power storage device and the estimated value of the minimum suppliable electric power of the external charging device, and charging is continued, when the difference between the supply electric power from the external charging device to the power storage device and the command value is less than the prescribed value. As a result, charging can be continued as much as possible.

In some embodiments, when determining that the difference is less than the prescribed value, the control unit continues charging by using, as the command value, electric power that is higher than the start-time electric power within a range not exceeding the limit value.

With such a configuration, when the difference between the supply electric power from the external charging device to the power storage device and the command value is less than the prescribed value, charging is continued by using, as the command value, the electric power that is higher than the start-time electric power within the range not exceeding the current limit value of the charging electric power for the power storage device. As a result, charging can be safely continued.

In some embodiments, the control unit controls charging such that charging is performed in the second mode by using, as the command value, a value obtained by subtracting a correction value from the limit value, detects supply electric power supplied from the external charging device to the power storage device, determines whether or not the detected supply electric power exceeds the limit value, and decreases the correction value and continues charging, when determining that the detected supply electric power does not exceed the limit value.

With such a configuration, charging is controlled such that charging is performed by using, as the command value, the value obtained by subtracting the correction value from the current limit value of the charging electric power for the power storage device, and the correction value is decreased and charging is continued, when the supply electric power from the external charging device to the power storage device does not exceed the limit value. As a result, charging can be safely continued as much as possible.

The foregoing and other objects, features, aspects and advantages of the present disclosure will become more apparent from the following detailed description of the present disclosure when taken in conjunction with the accompanying drawings.

DETAILED DESCRIPTION

First Embodiment

Embodiments of the present disclosure will be described in detail hereinafter with reference to the drawings, in which the same or corresponding portions are denoted by the same reference characters and description thereof will not be repeated.

<Configuration of Charging System>

Figure 1:
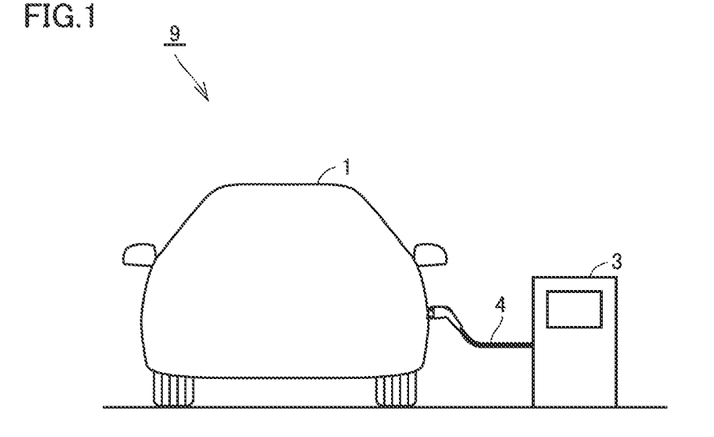
FIG. 1 schematically shows an overall configuration of a charging system according to the present embodiment.

FIG. 1 schematically shows an overall configuration of a charging system 9 according to the present embodiment. Referring to FIG. 1, charging system 9 includes a vehicle 1 of a user, a charger 3, and a charging cable 4 extending from charger 3.

Vehicle 1 is, for example, an electric vehicle having a battery 11 (see FIG. 2 below) mounted thereon. Vehicle 1 can perform "external charging" for charging battery 11 with electric power supplied from charger 3 in a state where vehicle 1 is electrically connected to charger 3 by charging cable 4. Vehicle 1 may be any vehicle as long as it can perform the external charging. Vehicle 1 may be a plug-in hybrid vehicle or a fuel cell vehicle.

Charger 3 is placed at, for example, a public charging stand (also called "charging spot" or "charging station"). Charger 3 converts AC power (e.g., three-phase power of 200 V) supplied from a commercial power supply into DC power and supplies the DC power to vehicle 1.

In the present embodiment, charger 3 is a charger adapted to perform quick charging. Furthermore, for charger 3 in the present embodiment, nominal minimum electric power corresponding to an outputtable nominal minimum current is predetermined and stored. Charger 3 transmits the minimum electric power to vehicle 1 at the start of charging of battery 11 of vehicle 1.

Figure 2:
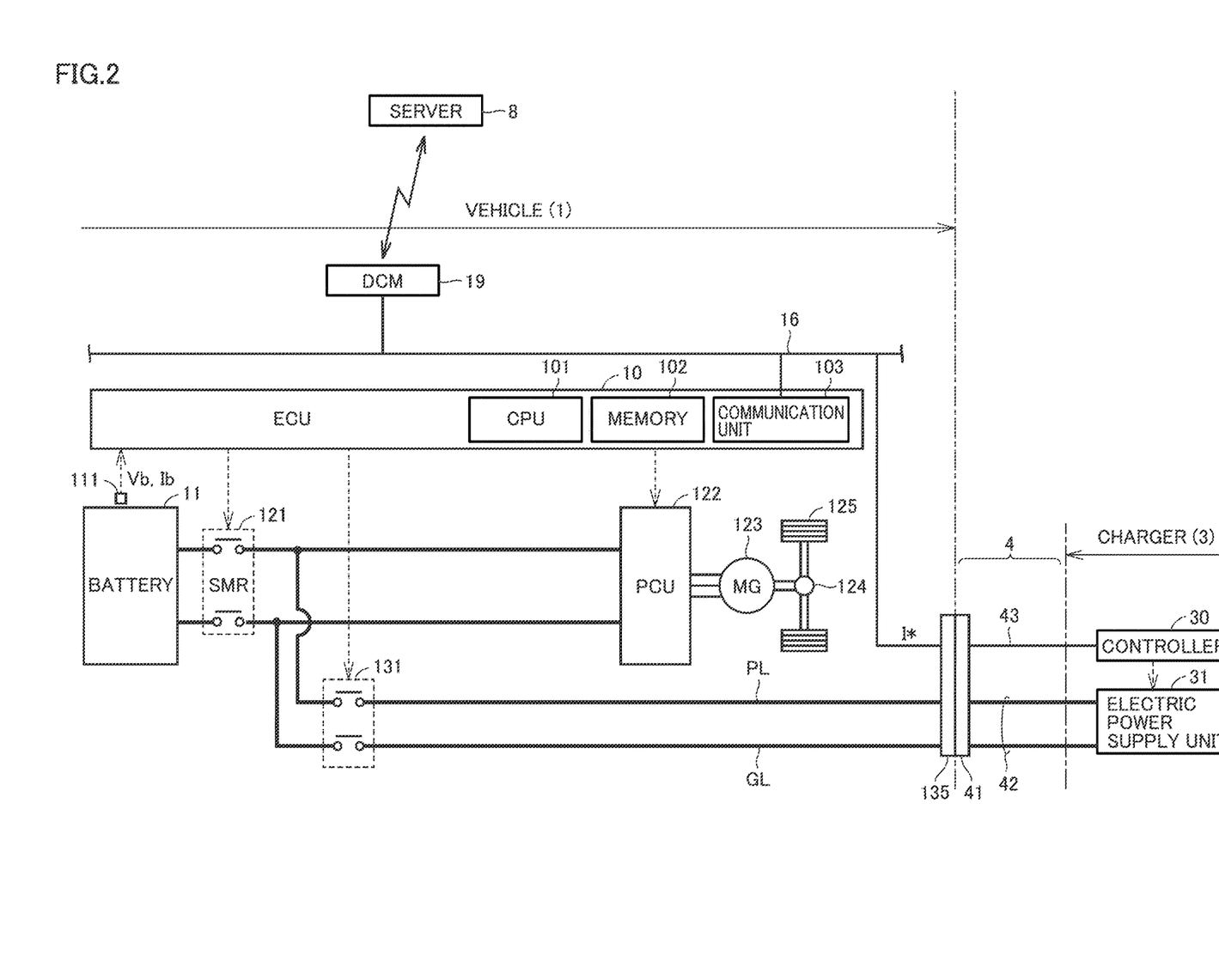
FIG. 2 shows the configuration of the charging system in more detail.

FIG. 2 shows the configuration of charging system 9 in more detail. Referring to FIGS. 1 and 2, vehicle 1 includes battery 11, a monitoring unit 111, a system main relay (SMR) 121, a power control unit (PCU) 122, a motor generator (MG) 123, a motive power transmission gear 124, a driving wheel 125, an electronic control unit (ECU) 10, and a data communication module (DCM) 19.

Battery 11 is a rechargeable power storage device and includes a secondary battery such as a lithium ion secondary battery or a nickel-metal hydride battery. Battery 11 supplies, to PCU 122, electric power for generating traveling driving force of vehicle 1. In addition, battery 11 is charged with electric power generated by regenerative braking of motor generator 123, or charged with supply electric power from charger 3. Instead of battery 11, a capacitor such as an electric double layer capacitor may be used.

Monitoring unit 111 monitors a state of battery 11. Although not shown, monitoring unit 111 includes a voltage sensor, a current sensor and a temperature sensor. The voltage sensor detects a voltage Vb of battery 11. The current sensor detects a current Ib input to and output from battery 11. The temperature sensor detects a temperature of battery 11. Each sensor outputs the result of detection to ECU 10. ECU 10 can calculate a state of charge (SOC) of battery 11 based on the result of detection by each sensor.

SMR 121 is electrically connected between battery 11 and PCU 122. Closing/opening of SMR 121 is controlled in accordance with a command from ECU 10.

PCU 122 is a power converter that performs power conversion between battery 11 and motor generator 123 in accordance with a command from ECU 10. PCU 122 includes an inverter that receives electric power from battery 11 and drives motor generator 123, a converter that adjusts a level of a DC voltage supplied to the inverter (both the inverter and the converter are not shown), and the like.

Motor generator 123 is an AC motor. Motor generator 123 is driven by the inverter included in PCU 122, and rotates a drive shaft. Torque output by motor generator 123 is transmitted to driving wheel 125 through motive power transmission gear 124, to thereby cause vehicle 1 to travel. During braking of vehicle 1, motor generator 123 receives rotational force of driving wheel 125 and generates electric power. The electric power generated by motor generator 123 is charged into battery 11 through PCU 122.

Vehicle 1 further includes a charging relay 131, power lines PL and GL, and an inlet 135 as a configuration for quick charging.

Charger 3 includes a controller 30 and an electric power supply unit 31. Charging cable 4 includes a power line 42, a communication line 43 and a connector 41.

During quick charging of battery 11, connector 41 of charging cable 4 is coupled to inlet 135. Electric power from charger 3 is supplied to vehicle 1 through power line 42 in charging cable 4, and is transmitted to charging relay 131 through power lines PL and GL.

Charging relay 131 and SMR 121 are electrically connected between battery 11 and inlet 135. When charging relay 131 is closed and SMR 121 is closed, power transmission between inlet 135 and battery 11 becomes possible.

ECU 10 is connected to and communicable with DCM 19 and the like through a wired vehicle-mounted network 16 such as CAN (Controller Area Network). In a state where vehicle 1 is connected to charger 3 by charging cable 4, ECU 10 is also bidirectionally communicable with controller 30 of charger 3 through communication line 43 in charging cable 4 and vehicle-mounted network 16.

DCM 19 is a communication unit that is wirelessly communicable with an external device such as a server 8. DCM 19 includes a communication module that complies with, for example, a communication standard such as W-CDMA (Wideband Code Division Multiple Access) or LTE (Long Term Evolution), or a wireless LAN (Local Area Network) standard such as IEEE (Institute of Electrical and Electronic Engineers) 802.11. Although not shown, the communication between DCM 19 and server 8 is performed through a server of a communication service provider using DCM 19; a server, a base station and a communication line of a communication carrier; WAN (Wide Area Network) such as the Internet; and a communication network such as a wireless LAN in a facility.

ECU 10 includes a central processing unit (CPU) 101, a memory 102, a communication unit 103, an input/output port (not shown) through which various signals are input and output, and the like. ECU 10 controls the devices (such as SMR 121, PCU 122 and charging relay 131) in vehicle 1 such that vehicle 1 enters a desired state. ECU 10 corresponds to "charging control device" according to the present disclosure.

There has been conventionally known a technique for stopping charging when an abnormality is detected in control of charging of battery 11 from charger 3.

A nominal minimum output current is set for charger 3 adapted to perform quick charging. Therefore, in principle, control for charging battery 11 with electric power that is less than minimum electric power corresponding to the nominal minimum output current is impossible. In addition, when battery 11 is charged with electric power that exceeds a limit value Win of charging electric power for battery 11, battery 11 is burdened, which leads to a failure or a short life of battery 11. Therefore, when it is predicted that charging electric power limit value Win of battery 11 will fall below the minimum electric power corresponding to the minimum output current of charger 3, i.e., when a predicted minimum value of Win<the minimum electric power of charger 3 is satisfied, the charging electric power for battery 11 exceeds the predicted minimum value of limit value Win, and thus, exceeds limit value Win with high possibility. Therefore, charging is stopped in order to protect battery 11. As a result, charging can be safely performed.

In charger 3, although control for charging battery 11 with actual minimum electric power that is less than the nominal minimum electric power is actually possible, a notification about the nominal minimum electric power that is higher than the actual minimum electric power may in some cases be provided to the battery 11 side. In this case, charging is stopped, although charging can be continued actually, which may make it impossible to perform charging as much as possible.

Accordingly, CPU 101 of ECU 10 according to the present disclosure calculates a predicted minimum value of a limit value Win of charging electric power for battery 11, obtains a nominal value of minimum suppliable electric power of charger 3 from charger 3, determines whether or not the calculated predicted minimum value is smaller than the obtained nominal value, when determining that the predicted minimum value is not smaller than the nominal value, controls charging such that charging of battery 11 from charger 3 is performed in a normal mode, the normal mode being a mode in which a lower limit of a command value of supply electric power from charger 3 is the nominal value, when determining that the predicted minimum value is smaller than the nominal value, controls charging such that charging of battery 11 from charger 3 is performed in an estimation mode, the estimation mode being different from the normal mode and being a mode in which the lower limit of the command value is an estimated value of the minimum suppliable electric power of charger 3, the estimated value being smaller than the nominal value, and controls charging such that charging is performed in the estimation mode by using, as the command value, electric power between a current limit value of the charging electric power for battery 11 and the estimated value.

Thus, even when the predicted minimum value of the limit value of the charging electric power for battery 11 is smaller than the nominal value of the minimum suppliable electric power of charger 3, charging is performed by using, as the command value, the electric power between the current limit value of the charging electric power for battery 11 and the estimated value of the minimum suppliable electric power of charger 3. Therefore, even when the predicted minimum value is smaller than the nominal value of the minimum suppliable electric power, charging can be continued as much as possible. In addition, charging can be continued so as not to exceed the current limit value of the charging electric power. As a result, charging can be safely continued as much as possible.

Figure 3:
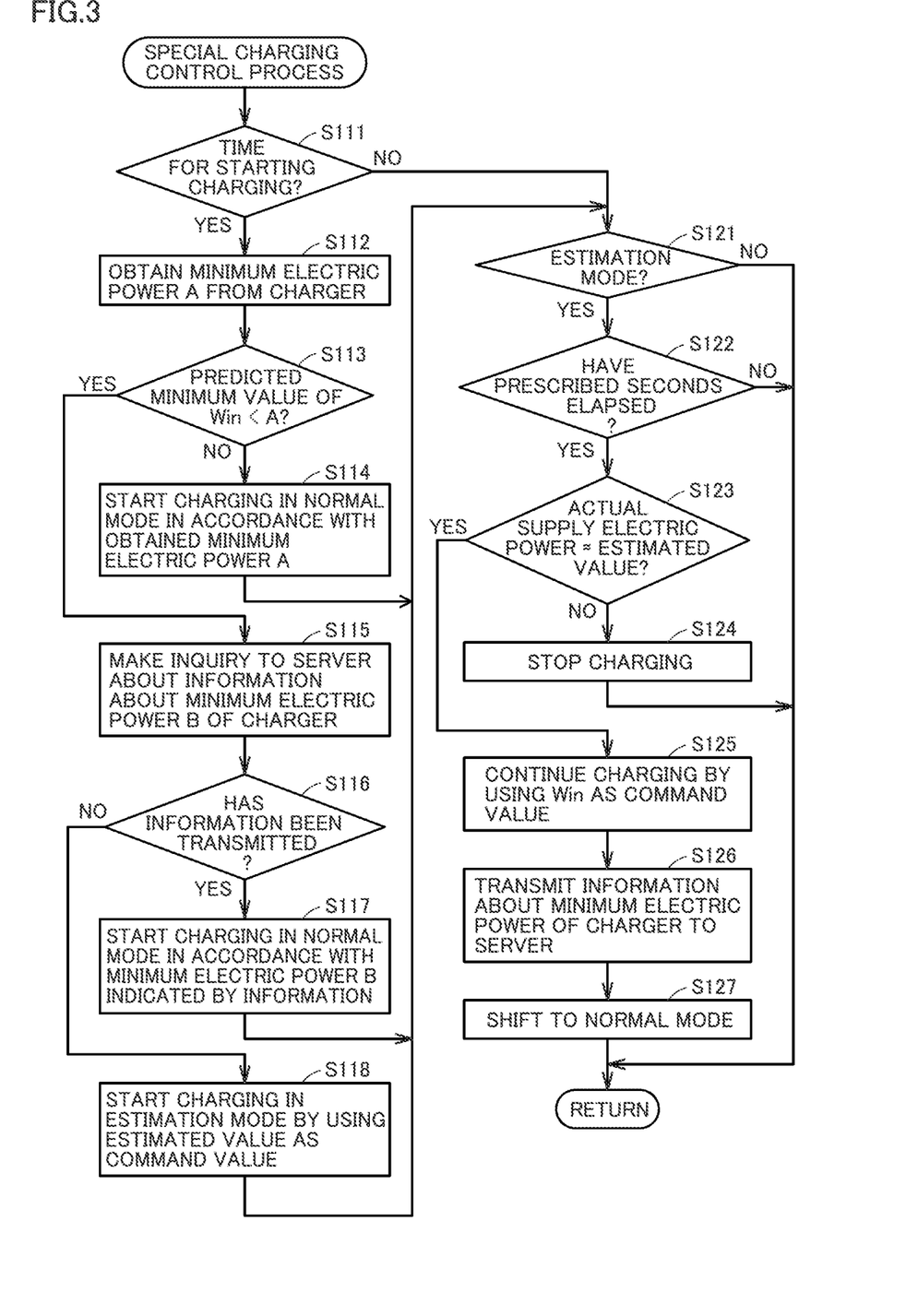
FIG. 3 is a flowchart showing a flow of a special charging control process in a first embodiment.

Control in the present embodiment will be described below. FIG. 3 is a flowchart showing a flow of a special charging control process in a first embodiment. The special charging control process is invoked from a higher-level process every prescribed period and performed by CPU 101 of ECU 10.

Referring to FIG. 3, CPU 101 determines whether or not it is the time for starting charging of battery 11 of vehicle 1 (step S111). The determination is based on, for example, whether or not communication between ECU 10 of vehicle 1 and controller 30 of charger 3 before the start of charging has been started.

When CPU 101 determines that it is the time for starting charging (YES in step S111), CPU 101 obtains nominal minimum electric power A stored in charger 3, from controller 30 of charger 3 through communication line 43 of charging cable 4, vehicle-mounted network 16, and communication unit 103 by communication with charger 3 (step S112). CPU 101 calculates a predicted minimum value of limit value Win of charging electric power based on a deterioration state, a temperature and an SOC of battery 11, and determines whether or not the calculated predicted minimum value of Win is less than obtained minimum electric power A (predicted minimum value of Win<A) (step S113).

When CPU 101 determines that the predicted minimum value of Win<A is not satisfied (NO in step S113), i.e., when CPU 101 determines that the predicted minimum value of Win≤A is satisfied, CPU 101 controls charging such that charging is started in a normal mode in accordance with obtained minimum electric power A (step S114). The normal mode is a mode of performing charging by using, as a command value to charger 3, prescribed electric power between an upper limit and a lower limit, the upper limit being a current limit value Win of the charging electric power, the lower limit being known minimum electric power of charger 3.

When CPU 101 determines that the predicted minimum value of Win<A is satisfied (YES in step S113), CPU 101 makes an inquiry to server 8 about whether or not information about minimum electric power B of charger 3 is stored in server 8 (step S115).

When, in accordance with a command value of electric power that is less than nominal minimum electric power A of charger 3, charger 3 can supply the electric power indicated by the command value to battery 11 during charging of battery 11 from charger 3, CPU 101 of ECU 10 of vehicle 1 transmits the value of the electric power to server 8 as the information about minimum electric power B of charger 3. Server 8 stores the value of the electric power indicated by the information about minimum electric power B of charger 3 used by vehicle 1, which is transmitted from DCM 19 of vehicle 1, together with information that can identify charger 3. When CPU 101 of ECU 10 of vehicle 1 makes an inquiry about the information about minimum electric power B of charger 3, server 8 transmits the information to vehicle 1, if server 8 stores the information about minimum electric power B of charger 3.

CPU 101 determines whether or not the information about minimum electric power B of charger 3 is stored in server 8 and the information has been transmitted from server 8 through DCM 19, vehicle-mounted network 16 and communication unit 103 (step S116). When CPU 101 determines that the information has been transmitted (YES in step S116), CPU 101 controls charging such that charging is started in the normal mode in accordance with minimum electric power B indicated by the information (step S117).

In contrast, when CPU 101 determines that the information has not been transmitted (NO in step S116), CPU 101 controls charging such that charging is started in an estimation mode by using an estimated value of the minimum electric power of charger 3 as the command value (step S118). The estimation mode is a mode of performing charging by using, as the command value to charger 3, prescribed electric power between an upper limit and a lower limit, the upper limit being current limit value Win of the charging electric power, the lower limit being the estimated value of the minimum electric power (unknown minimum electric power) of charger 3. The estimated value may be, for example, a value defined as the minimum electric power in standards for charging facilities such as charger 3, or may be a value (e.g., average value of research results) based on results of market research about the minimum electric power in the type of charger 3.

When CPU 101 determines that it is not the time for starting charging (NO in step S111), after step S114, after step S117, and after step S118, CPU 101 determines whether or not the current mode is the estimation mode (step S121). When CPU 101 determines that the current mode is not the estimation mode (NO in step S121), CPU 101 returns a process to be performed to a higher-level process from which the current process is invoked.

In contrast, when CPU 101 determines that the current mode is the estimation mode (YES in step S121), CPU 101 determines whether or not prescribed seconds have elapsed from the start of charging in the estimation mode (step S122). When CPU 101 determines that the prescribed seconds have not elapsed (NO in step S122), CPU 101 returns a process to be performed to a higher-level process from which the current process is invoked.

In contrast, when CPU 101 determines that the prescribed seconds have elapsed (YES in step S122), CPU 101 determines whether or not actual supply electric power from charger 3 to battery 11 is closely analogous to the estimated value of the minimum electric power of charger 3, which is the command value to charger 3 (step S123). Whether or not the actual supply electric power is closely analogous to the estimated value is determined based on, for example, whether or not a difference between the actual supply electric power and the estimated value is within a prescribed error. When CPU 101 determines that the actual supply electric power is not closely analogous to the estimated value (NO in step S123), i.e., when charger 3 cannot output the estimated value as the actual supply electric power, CPU 101 stops charging (step S124) and returns a process to be performed to a higher-level process from which the current process is invoked.

In contrast, when CPU 101 determines that the actual supply electric power is closely analogous to the estimated value (YES in step S123), CPU 101 specifies current limit value Win of the charging electric power of battery 11 and continues charging by using Win as the command value (step S125). CPU 101 transmits the estimated value to server 8 as the information about the minimum electric power of charger 3 (step S126). Thereafter, CPU 101 shifts the mode from the estimation mode to the normal mode (step S127) and returns a process to be performed to a higher-level process from which the current process is invoked.

Figure 4:
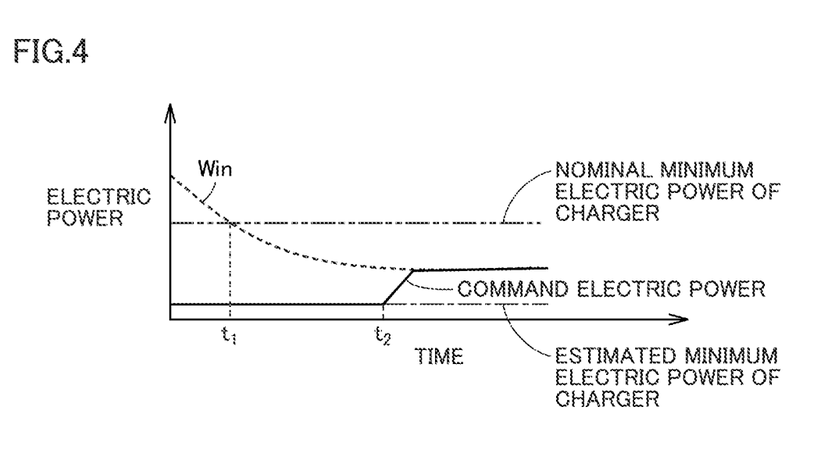
FIG. 4 shows one example of the progression of charging in the first embodiment.

FIG. 4 shows one example of the progression of charging in the first embodiment. Referring to FIG. 4, at the start of charging, charging is started by using the estimated value of the minimum electric power of charger 3 as the command value. When the nominal minimum electric power of charger 3 is correct, limit value Win of the charging electric power of battery 11 at this time falls below the nominal minimum electric power at time t1. In principle, charger 3 cannot output electric power that is equal to or less than the nominal minimum electric power, and thus, it is determined that charger 3 cannot output electric power that is equal to or less than limit value Win, and charging may be ended.

However, in the present embodiment, charging is started by using the estimated value of the minimum electric power of charger 3, and when charger 3 can output the electric power indicated by the estimated value, charging is continued. At time t2, it is determined that the prescribed seconds have elapsed from the start of charging by using the estimated value, and charging is continued by using limit value Win at this time as the command value of the charging electric power. Thus, even when the predicted minimum value of the charging electric power of battery 11 is smaller than the nominal minimum electric power of charger 3, charging can be continued as much as possible. In addition, charging can be continued so as not to exceed current limit value Win of the charging electric power. As a result, charging can be safely continued as much as possible.

Second Embodiment

In the first embodiment, charging is controlled such that charging is started in the estimation mode by using, as the command value, start-time electric power (estimated value in the first embodiment) between the current limit value of the charging electric power of battery 11 and the estimated value of the minimum electric power of charger 3, and when the difference between the actual supply electric power from charger 3 to battery 11 and the estimated value is less than the prescribed value, charging is continued. When the difference is less than the prescribed value, charging is continued by using, as the command value, electric power (current limit value Win in the first embodiment) that is higher than the start-time electric power within a range not exceeding current limit value Win of the charging electric power.

In a second embodiment, charging is controlled such that charging is performed in the estimation mode by using, as the command value, a value obtained by subtracting a correction value from current limit value Win of the charging electric power of battery 11, and when the actual supply electric power from charger 3 to battery 11 does not exceed limit value Win, the correction value is decreased and charging is continued. As to the correction value, the value obtained by subtracting the correction value from current limit value Win of the charging electric power of battery 11 is set so as not to fall below the estimated value of the minimum electric power of charger 3.

Figure 5:
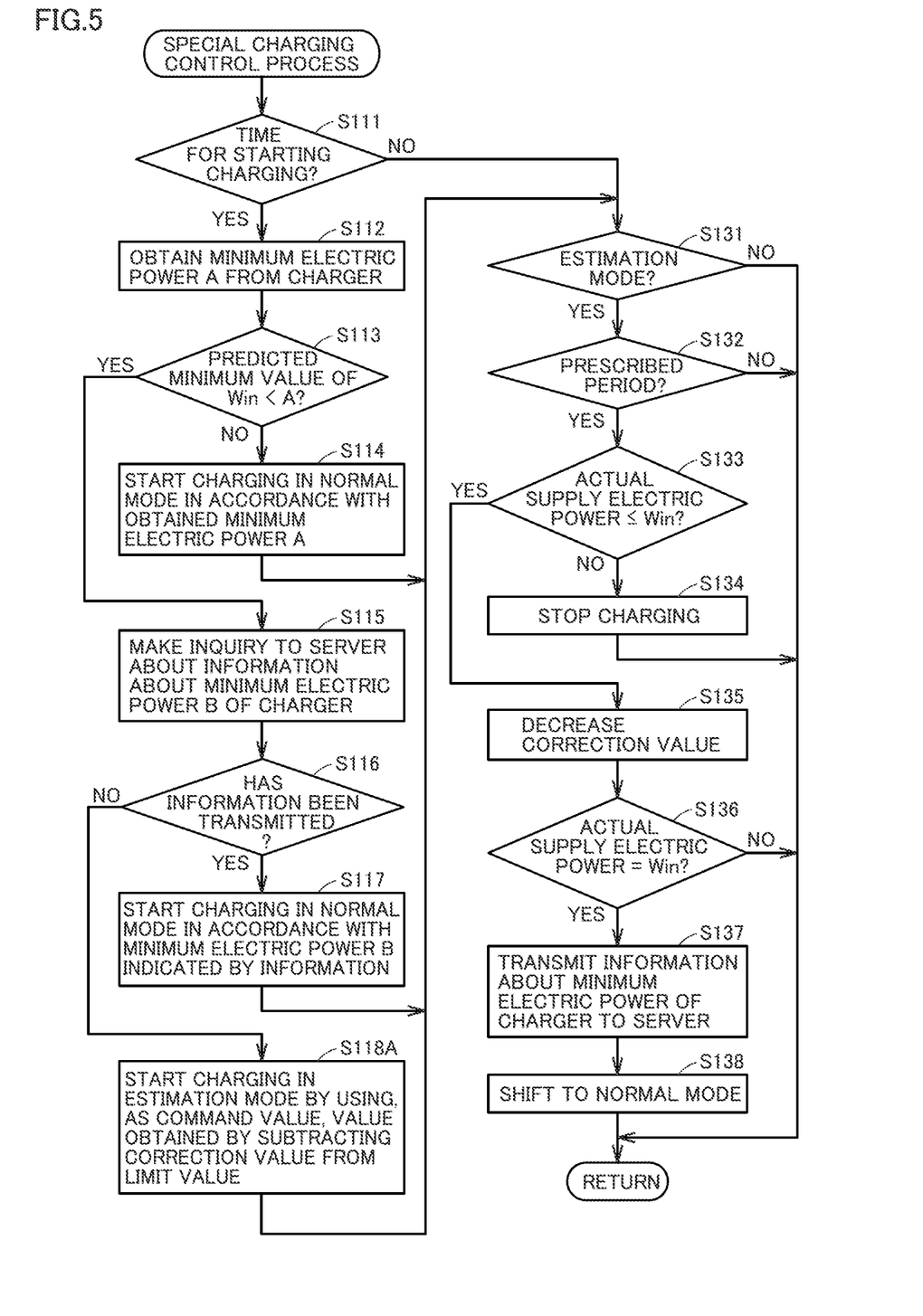
FIG. 5 is a flowchart showing a flow of a special charging control process in a second embodiment.

FIG. 5 is a flowchart showing a flow of a special charging control process in the second embodiment. The special charging control process is invoked from a higher-level process every prescribed period and performed by CPU 101 of ECU 10. Referring to FIG. 5, steps S111 to S117 are the same as those in FIG. 3, and thus, description thereof will not be repeated.

In step S116, when CPU 101 determines that the information about minimum electric power B of charger 3 is not stored in server 8 and has not been transmitted from server 8 (NO in step S116), CPU 101 controls charging such that charging is started in the estimation mode by using, as the command value, the value obtained by subtracting the correction value from current limit value Win of the charging electric power of battery 11 (step S118A). As to the correction value, the value obtained by subtracting the correction value from current limit value Win of the charging electric power of battery 11 is set so as not to fall below the estimated value of the minimum electric power of charger 3.

When CPU 101 determines that it is not the time for starting charging (NO in step S111), after step S114, after step S117, and after step S118A, CPU 101 determines whether or not the current mode is the estimation mode (step S131). When CPU 101 determines that the current mode is not the estimation mode (NO in step S131), CPU 101 returns a process to be performed to a higher-level process from which the current process is invoked.

In contrast, when CPU 101 determines that the current mode is the estimation mode (YES in step S131), CPU 101 determines whether or not the current time is the time for each prescribed period from the start of charging in the estimation mode (step S132). The prescribed period may be the same as or different from the prescribed period at which the special charging control process is invoked. When CPU 101 determines that the current time is not the time for each prescribed period (NO in step S132), CPU 101 returns a process to be performed to a higher-level process from which the current process is invoked.

In contrast, when CPU 101 determines that the current time is the time for each prescribed period (YES in step S132), CPU 101 determines whether or not the actual supply electric power from charger 3 to battery 11 is equal to or less than current limit value Win of the charging electric power of battery 11 (step S133). When CPU 101 determines that the actual supply electric power is not equal to or less than current limit value Win (NO in step S133), i.e., when the actual supply electric power exceeds limit value Win, CPU 101 stops charging (step S134) and returns a process to be performed to a higher-level process from which the current process is invoked.

In contrast, when CPU 101 determines that the actual supply electric power is equal to or less than limit value Win (YES in step S133), CPU 101 decreases the correction value and continues charging (step S135). The correction value may be decreased at a prescribed rate, or may be decreased by a prescribed value.

Then, CPU 101 determines whether or not the correction value has become zero, i.e., whether or not the actual supply electric power has become equal to limit value Win (step S136). When CPU 101 determines that the actual supply electric power has not become equal to limit value Win (NO in step S136), CPU 101 returns a process to be performed to a higher-level process from which the current process is invoked.

Figure 6:
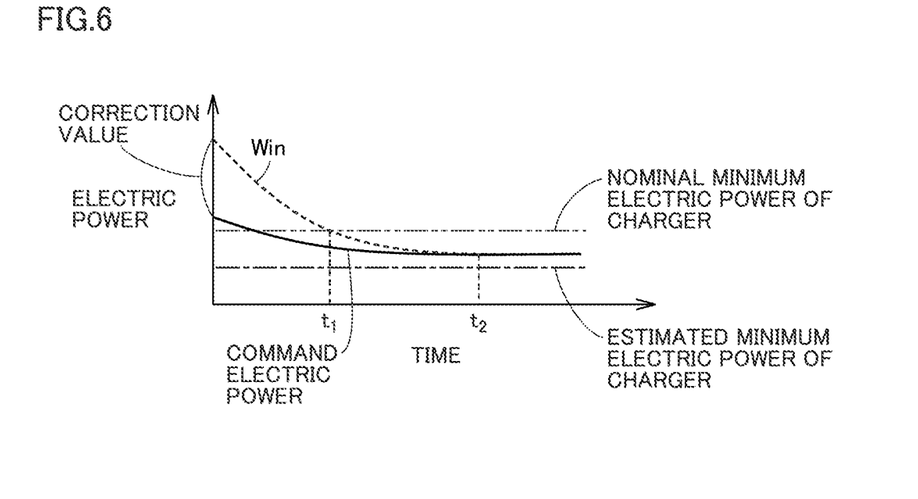
FIG. 6 shows one example of the progression of charging in the second embodiment.

In contrast, when CPU 101 determines that the actual supply electric power has become equal to limit value Win (YES in step S136), CPU 101 transmits the value of the actual supply electric power at this time to server 8 as the information about the minimum electric power of charger 3 (step S137). Thereafter, CPU 101 shifts the mode from the estimation mode to the normal mode (step S138) and returns a process to be performed to a higher-level process from which the current process is invoked. FIG. 6 shows one example of the progression of charging in the second embodiment. Referring to FIG. 6, charging is started by using, as the command value, the value obtained by subtracting the correction value from current limit value Win of the charging electric power of battery 11. Then, the correction value is decreased every prescribed period. When the nominal minimum electric power of charger 3 is correct, limit value Win of the charging electric power of battery 11 at this time falls below the nominal minimum electric power at time t1. In principle, charger 3 cannot output electric power that is equal to or less than the nominal minimum electric power, and thus, it is determined that charger 3 cannot output electric power that is equal to or less than limit value Win, and charging may be ended.

However, in the present embodiment, charging is performed by using the command value obtained by subtracting the correction value from limit value Win, and the correction value is set such that the value obtained by subtracting the correction value from limit value Win does not fall below the estimated value of the minimum electric power of charger 3. When the actual supply electric power corresponding to the command value obtained by subtracting the correction value from limit value Win does not exceed limit value Win, i.e., when charger 3 can output the electric power indicated by the command value, charging is continued. Thus, even when the predicted minimum value of the charging electric power of battery 11 is smaller than the nominal minimum electric power of charger 3, charging can be continued as much as possible. In addition, charging can be continued so as not to exceed current limit value Win of the charging electric power. As a result, charging can be safely continued as much as possible.

[Modification]

(1) In the above-described first embodiment, as shown in step S118 in FIG. 3, the estimated value is a predetermined value. However, the present disclosure is not limited thereto, and the estimated value may be looked for at the start of charging. Specifically, when the predicted minimum value of limit value Win of the charging electric power of battery 11 is smaller than minimum electric power A obtained from charger 3 at the start of charging, the command value to charger 3 may be gradually decreased from minimum electric power A and the electric power when the actual supply electric power no longer decreases may be defined as the estimated value of the minimum electric power.

(2) In the above-described second embodiment, as shown in step S136 in FIG. 5, when it is determined that the actual supply electric power has become equal to limit value Win, steps S137 and S138 are performed. However, the present disclosure is not limited thereto, and even if the actual supply electric power has not become equal to limit value Win, steps S137 and S138 may be performed when it is determined that a prescribed time period has elapsed.

(3) In the above-described embodiment, as shown in step S112 in FIG. 3, minimum electric power A is received by CPU 101 from controller 30 of charger 3 through communication line 43 of charging cable 4 of vehicle 1, vehicle-mounted network 16 and communication unit 103. As shown in step S116 in FIG. 3, the information about minimum electric power B is received by CPU 101 from server 8 through DCM 19 of vehicle 1, vehicle-mounted network 16 and communication unit 103.

However, the present disclosure is not limited thereto, and the information about minimum electric power A may be received by CPU 101 from controller 30 of charger 3 through DCM 19 of vehicle 1, vehicle-mounted network 16 and communication unit 103 by wireless communication. In addition, the information about minimum electric power B may be received by CPU 101 from server 8 through controller 30 of charger 3, communication line 43 of charging cable 4 of vehicle 1, vehicle-mounted network 16, and communication unit 103. In addition to the above-described communication method, the communication by CPU 101 of ECU 10 such as the communication about minimum electric power A and minimum electric power B may be performed using any other communication method such as PLC (Power Line Communication) communication or CAN communication.

(4) In the above-described embodiment, the processes in FIGS. 3 and 5 are performed by CPU 101 of ECU 10 of vehicle 1. However, the present disclosure is not limited thereto, and the processes in FIGS. 3 and 6 may be performed by a dedicated ECU for charging control. The charging control ECU may be built into ECU 10, or may be mounted separately from ECU 10.

[Conclusion]

(1) As shown in FIG. 2, ECU 10 includes CPU 101 that controls charging and discharging of battery 11. As shown in FIGS. 3 and 5, CPU 101 calculates a predicted minimum value of a limit value Win of charging electric power for battery 11 (step S113), obtains minimum electric power A of charger 3 from charger 3 (step S112), determines whether or not the predicted minimum value is smaller than minimum electric power A (step S113), when determining that the predicted minimum value is not smaller than minimum electric power A, controls charging such that charging of battery 11 from charger 3 is performed in a normal mode (step S114), the normal mode being a mode in which a lower limit of a command value of supply electric power from charger 3 is set to minimum electric power A which is the nominal value, when determining that the predicted minimum value is smaller than minimum electric power A, controls charging such that charging of battery 11 from charger 3 is performed in an estimation mode (step S118, step S125, step S118A, step S135), the estimation mode being different from the normal mode and being a mode in which the lower limit of the command value is set to an estimated value of the minimum electric power of charger 3, the estimated value being smaller than minimum electric power A which is the nominal value, and controls charging such that charging is performed in the estimation mode by using, as the command value, electric power between a current limit value Win of the charging electric power for battery 11 and the estimated value (step S118, step S125, step S118A, step S135).

Thus, even when the predicted minimum value of limit value Win of the charging electric power of battery 11 is smaller than the nominal value of the minimum electric power of charger 3, charging is performed by using, as the command value, the electric power between current limit value Win of the charging electric power of battery 11 and the estimated value of the minimum electric power of charger 3. Therefore, even when the predicted minimum value is smaller than the nominal value of the minimum electric power, charging can be continued as much as possible. In addition, charging can be continued so as not to exceed current limit value Win of the charging electric power. As a result, charging can be safely continued as much as possible.

(2) As shown in FIG. 3, CPU 101 controls charging such that charging is started in the estimation mode by using, as the command value, start-time electric power between limit value Win and the estimated value (step S118), detects supply electric power supplied from charger 3 to battery 11 (step S123), determines whether or not a difference between the detected supply electric power and the command value is less than a prescribed value (step S123), and continues charging, when determining that the difference is less than the prescribed value (step S125).

Thus, charging is started by using, as the command value, the start-time electric power between current limit value Win of the charging electric power of battery 11 and the estimated value of the minimum electric power of charger 3, and charging is continued, when the difference between the supply electric power from charger 3 to battery 11 and the command value is less than the prescribed value. As a result, charging can be continued as much as possible.

(3) As shown in FIG. 3, when determining that the difference is less than the prescribed value, CPU 101 continues charging by using, as the command value, electric power that is higher than the start-time electric power within a range not exceeding limit value Win (step S125).

Thus, when the difference between the supply electric power from charger 3 to battery 11 and the command value is less than the prescribed value, charging is continued by using, as the command value, the electric power that is higher than the start-time electric power within the range not exceeding current limit value Win of the charging electric power of battery 11. As a result, charging can be safely continued.

(4) As shown in FIG. 5, CPU 101 controls charging such that charging is performed in the estimation mode by using, as the command value, a value obtained by subtracting a correction value from limit value Win (step S118A, step S135), detects supply electric power supplied from charger 3 to battery 11 (step S133), determines whether or not the detected supply electric power exceeds limit value Win (step S133), and decreases the correction value and continues charging, when determining that the detected supply electric power does not exceed limit value Win (step S135).

Thus, charging is controlled such that charging is performed by using, as the command value, the value obtained by subtracting the correction value from current limit value Win of the charging electric power of battery 11, and the correction value is decreased and charging is continued, when the supply electric power from charger 3 to battery 11 does not exceed limit value Win. As a result, charging can be safely continued as much as possible.

While the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A charging control device including a control unit that controls charging and discharging of a power storage device, wherein
the control unit
calculates a predicted minimum value of a limit value of charging electric power for the power storage device,
obtains, from the external charging device, a nominal value of minimum suppliable electric power of an external charging device,
determines whether or not the predicted minimum value is smaller than the nominal value,
when determining that the predicted minimum value is not smaller than the nominal value, controls charging such that charging of the power storage device from the external charging device is performed in a first mode, the first mode being a mode in which a lower limit of a command value of supply electric power from the external charging device is set to the nominal value,
when determining that the predicted minimum value is smaller than the nominal value, controls charging such that charging of the power storage device from the external charging device is performed in a second mode, the second mode being different from the first mode and being a mode in which the lower limit of the command value is set to an estimated value of the minimum suppliable electric power of the external charging device, the estimated value being smaller than the nominal value, and
controls charging such that charging is performed in the second mode by using, as the command value, electric power between a current limit value of the charging electric power for the power storage device and the estimated value.

2. The charging control device according to claim 1, wherein
the control unit
controls charging such that charging is started in the second mode by using, as the command value, start-time electric power between the limit value and the estimated value,
detects supply electric power supplied from the external charging device to the power storage device,
determines whether or not a difference between the detected supply electric power and the command value is less than a prescribed value, and
continues charging, when determining that the difference is less than the prescribed value.

3. The charging control device according to claim 2, wherein
when determining that the difference is less than the prescribed value, the control unit continues charging by using, as the command value, electric power that is higher than the start-time electric power within a range not exceeding the limit value.

4. The charging control device according to claim 1, wherein
the control unit
controls charging such that charging is performed in the second mode by using, as the command value, a value obtained by subtracting a correction value from the limit value,
detects supply electric power supplied from the external charging device to the power storage device,
determines whether or not the detected supply electric power exceeds the limit value, and
decreases the correction value and continues charging, when determining that the detected supply electric power does not exceed the limit value.

* * * * *